(12) United States Patent
Chen et al.

(10) Patent No.: US 9,465,846 B2
(45) Date of Patent: Oct. 11, 2016

(54) STORING EVENTS FROM A DATASTREAM

(75) Inventors: Qiming Chen, Cupertino, CA (US);
Meichun Hsu, Los Altos Hills, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 32 days.

(21) Appl. No.: 13/111,740

(22) Filed: May 19, 2011

(65) Prior Publication Data
US 2012/0296861 A1 Nov. 22, 2012

(51) Int. Cl.
G06F 17/00 (2006.01)
G06F 17/30 (2006.01)

(52) U.S. Cl.
CPC ............... *G06F 17/30516* (2013.01)

(58) Field of Classification Search
CPC .. G06F 9/3851; G06F 9/3857; G06F 9/3861; G06F 2217/34
See application file for complete search history.

(56) References Cited

U.S. PATENT DOCUMENTS

| | | | | |
|---|---|---|---|---|
| 7,577,782 B2* | 8/2009 | Lym | ................... | G06F 13/10 710/305 |
| 7,996,388 B2* | 8/2011 | Jain | ................... | G06F 17/30516 707/713 |
| 8,073,826 B2* | 12/2011 | Srinivasan et al. | ........... | 707/702 |
| 2008/0120283 A1* | 5/2008 | Liu et al. | ........... | 707/4 |
| 2008/0275891 A1* | 11/2008 | Park et al. | ........... | 707/100 |
| 2009/0070765 A1* | 3/2009 | Alves et al. | ........... | 718/103 |
| 2009/0106214 A1* | 4/2009 | Jain et al. | ........... | 707/4 |
| 2009/0106218 A1* | 4/2009 | Srinivasan et al. | ........... | 707/4 |
| 2010/0106588 A1* | 4/2010 | Jones et al. | ........... | 705/14.24 |
| 2010/0287114 A1* | 11/2010 | Bartko et al. | ........... | 705/36 R |
| 2011/0313977 A1* | 12/2011 | Al-Kateb et al. | ........... | 707/688 |

OTHER PUBLICATIONS

Jiang et al, "Estreams: Towards an Integrated Model for Event and Stream Processing", Jul. 2004, The University of Texas at Arlington, pp. 1-24.*

* cited by examiner

*Primary Examiner* — Angelica Ruiz
(74) *Attorney, Agent, or Firm* — Michael A. Dryja

(57) ABSTRACT

A data stream is stored in a database. An event pipe stores a sliding window of events from the data stream. A query is responded to by utilizing the sliding window of events stored in the event pipe.

10 Claims, 2 Drawing Sheets

STORING EVENTS FROM A DATASTREAM

BACKGROUND

A data warehouse is typically composed of one or more databases that store data that a company accumulates and uses when making management decisions. Data access from a data warehouse is conventionally accomplished using data queries to the data warehouse.

Many business applications that require access to relational or object databases within a data warehouse utilize a data access objection (DAO). Within the DAO an application programming interface (API) such as a Java Database Connectivity (JDBC) provides the capability to execute queries, for example structure query language (SQL) queries, to a data warehouse.

When a data stream, such as a stream of stock quotes for a particular stock on a stock exchange, is stored in a data warehouse, access of portions of the data stream to perform calculations on "sliding-window" segments of the data can be cumbersome. This is because access to such data streams can require a large number of queries to the data warehouse. Each query requires system overhead such as query set-up and query tear-down.

DETAILED DESCRIPTION

A data stream composed of a continuous stream of events can be stored in a database within a data warehouse. The events can be data providing information about any phenomena. For example, the stream of events could be price quotes for a stock listed on a stock exchange. Applications may require access to the data stream, for example, to calculate a moving average of the price quotes for the stock. If the data stream is not managed or persisted by the application, the application would typically need to query the data warehouse for each price quote of the stock. This can be cumbersome and resource intensive because each query requires system overhead such as query set-up and query tear-down.

Figure 1:
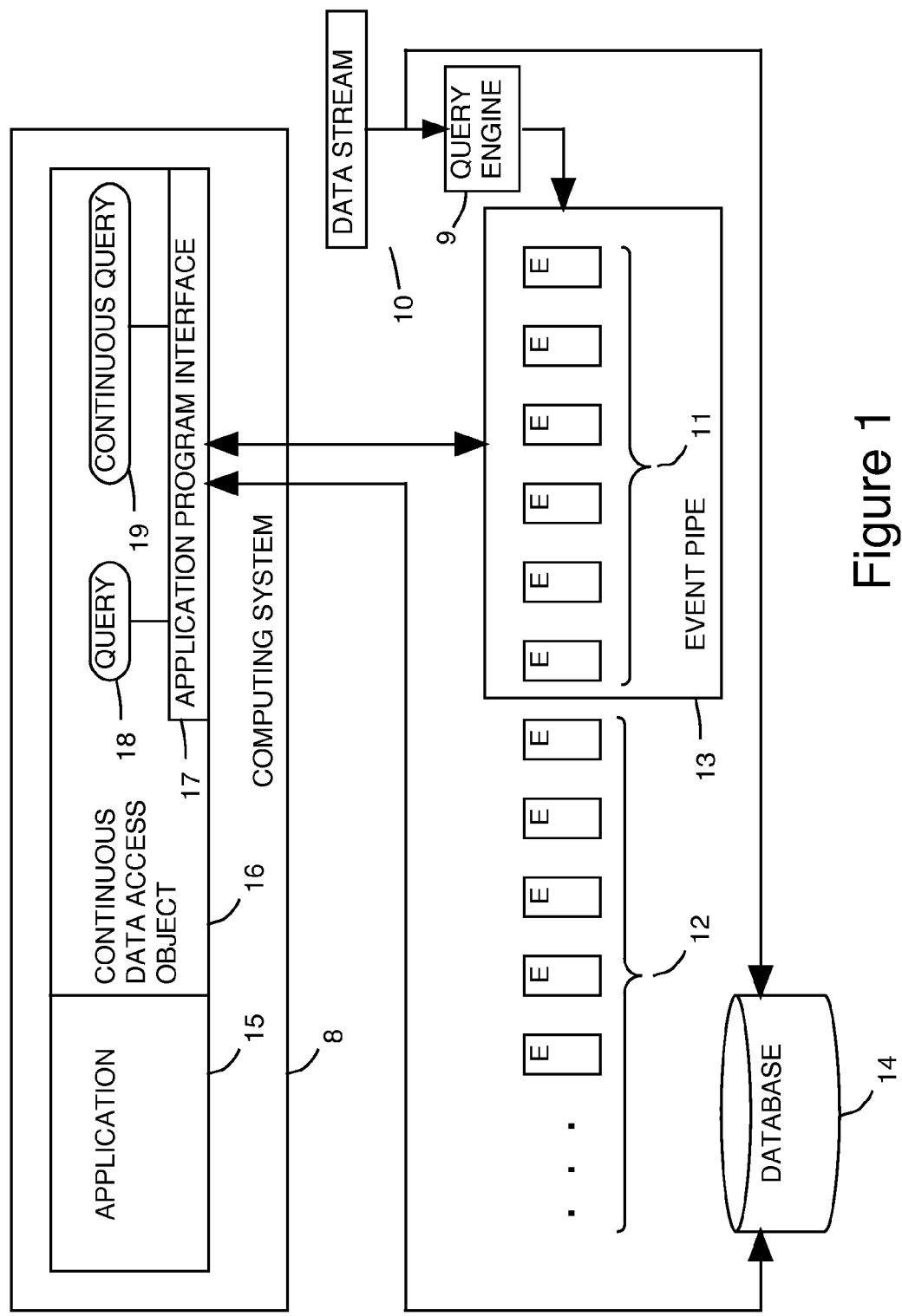
FIG. 1 shows a system that allows continuous data access of a data stream by using an event pipe in accordance with an implementation.

FIG. 1 shows a continuous querying mechanism that allows continuous data access of a data stream by using an event pipe. The continuous querying mechanism reduces the number of queries necessary when calculations are performed on a data stream.

In FIG. 1, data from a data stream 10, composed of a stream of events, is stored by a database 14 within a data warehouse. An application 15 within a computing system 8 performs processing on a sliding window of events within data stream 10. A sliding window of events is serial data, in this case representing a plurality of events, that is received in a buffer. When the buffer is full an operation can be performed on the data or in response to the data. The buffer is then emptied allowing new serial data to be received into the buffer.

A continuous data access object (CDAO) 16 is a component that is used by application 15 to access database 14. An application program interface (API) 17 within ODA( )16 is used to route queries to database 14. For example, API 17 is a Java Database connectivity (JDBC) application program interface.

For one time queries, represented in FIG. 1 by a query 18, API 17 routes the queries to database 14 in accordance with the conventional handling of such queries by a database management system (DBMS). Continuous queries, as represented in FIG. 1 by a continuous query 19, are handled by accessing streamed events stored in an event pipeline 13.

Event pipeline 13 acts as a buffer that receives and stores a sliding window of data from data stream 10 as delivered by a query engine 9. The sliding window of data stream 10 is represented in FIG. 1 by data for events 11 which are stored in event pipe 13. Events 12 represent events that after being removed from event pipe 13 are accessible from within database 14.

Event pipeline 13 can be implemented within API 17 or external to API 17. For example, event pipeline 13 can be implemented within API 17 using a continuously running event pipe query (EPQ) 20, shown in FIG. 2.

EPQ 20 captures and/or processes incoming events continuously, buffers the most recent results in sliding windows, and delivers these results upon request. The returned query results represent the effects of on-demand query evaluation on the contents of events 11 within event pipe 13.

A streaming capture function (SCF) 21 receives data stream 10 and receives information requests to deliver designated continuous query results. As SCF 21 receives data from data stream 10, SCF 21 generates stream elements 11, which are stored as tuples within event pipe 13. A tuple is a finite function that maps attributes to values. A particular event can be interpreted such that it causes SCF 11 to signal end-of-data to query engine 9 to terminate the current query execution.

A sliding window function (SWF) 22 provides buffering and continuously maintains events 11, or current data derived from events 11, that are currently within event pipeline 13.

When there is no current information request, SWF 22 continues to update events 11, dropping old windows of event data out of pipeline 13 as new event data are acquired. When API 17 requests sliding window data from pipeline 13, the current events 11 buffered within pipeline 13 or event processing results from the current events 11 buffered within pipeline 13 are returned to API 17 in a serial transfer from pipeline 13 to API 17. API 17 issues an END-OF-DATA query, to indicate when to stop sending event data from pipeline 13 to API 17. SWF 22 will then continue to update events 11, moving old event data out of pipeline 13 as new event data is acquired.

For example, suppose SCF 21 is a function: stream_reader(source). That is, the function stream_reader(source) is a streaming capture function (SCF) implemented in API 17. The parameter "source" is a stream source ID that identifies the data stream from which data is taken.

For example, the function stream_reader(source) returns tuples with attributes for a stock symbol listed on a stock exchange. The parameter "source" identifies the data stream for the stock symbol. Each tuple identifies values for the following attributes pertaining to the stock symbol: a stock identifier, a price, a time, and a special attribute with Boolean values—"cut". The "cut" is set true when information about the stock value over time is requested by the application.

Next, for example, suppose SWF 22 is a function: sliding_window(minutes,symbol,price,time,cut). That is, the function sliding_window(minutes,symbol,price,time,cut) is a sliding window function (SWF) implemented in API 17. The function sliding_window(minutes,symbol,price,time, cut) is used to continuously update and buffer the moving average of certain stock prices supplied by the data stream.

The first parameter of sliding_window( )"minutes" indicates a number of minutes which boundaries of sliding window, i.e., the amount of time for which the stock data is stored in the event pipe. The parameter "symbol" indicates a symbol for the stock. The parameter "price" indicates a price for the stock. The parameter "time" indicates a time at which the price occurs. The parameter "cut" is set true when stock quotes for a particular stock ticker are requested. When no request is received from the client applications, the value of "cut" is false and the function sliding_window( )returns nothing (NULL). When the value of "cut" is false, although an event processing query (EPQ) is running, its only effect is to maintain the sliding window container with nothing returned.

Figure 2:
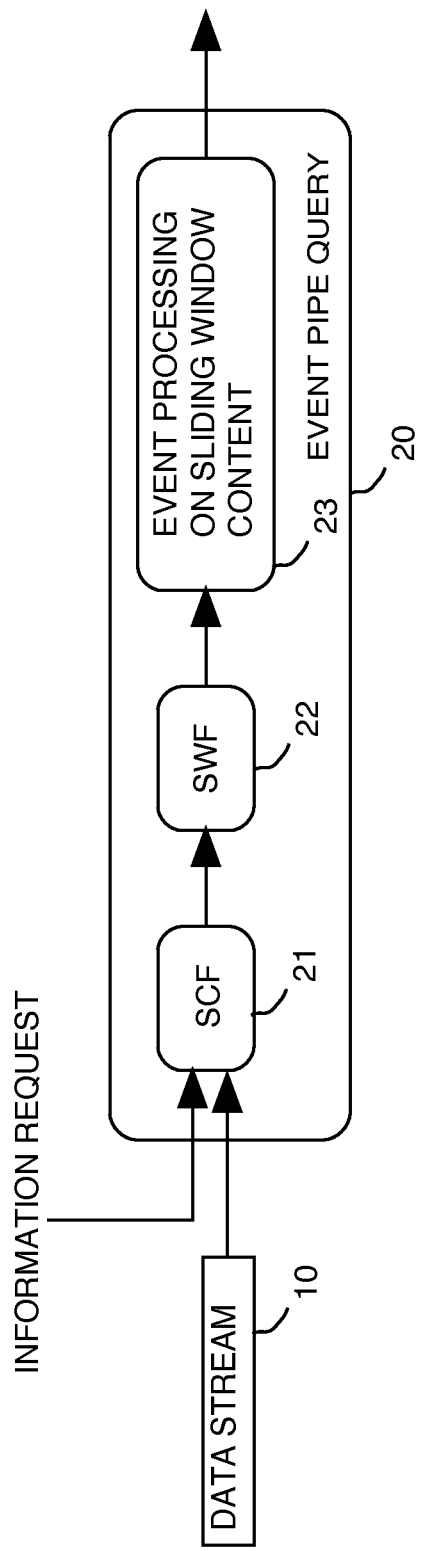
FIG. 2 shows an event pipe query in accordance with an implementation.

As shown in FIG. 2, event processing 23 selects data from SWF 22 to be returned, including the performance of any desired processing on the data returned from SWF 22. For example, event processing 23 could calculate a moving average of the price quotes for the stock as supplied by SWF 22.

For example, an event pipe query that uses SCF stream_reader( )and SWF sliding_window( )might look like the following:

SELECT sliding_window(60, symbol, price, time, cut)
FROM stream_reader(1);

In the simple query above the parameter "1" indicates the stream source idea for a particular stock.

When "cut" is set true and passed in the function sliding_window( ) together with the requested stock symbol, one or more tuples derived from the current sliding window content will be returned from sliding_window( )via event processing 23.

When cut is false, sliding_window( )returns NULL. When sliding_window( )returns NULL, event processing on the results of sliding_window( ) even database operations, such as an aggregate-group by operation, on the results of the sliding_window( )have no effect, do not accumulate data and do not cause a data jam.

Sliding windows can be used in a wide varied of ways. For example, within API 17, sliding windows of data on multiple data streams may be kept and updated with SWFs. There can be multiple SWFs for holding sliding windows in a single event pipe query. The content of a sliding window can express the raw events themselves or the data derived from them.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A method comprising:
receiving a data stream of continuous data;
setting up an event pipe in which is stored a sliding window of events from the data stream using a sliding window function having a parameter, wherein each event of the sliding window of events is stored within the event pipe as a tuple that maps attributes to values, and wherein old events within the event pipe are moved out of the event pipe as new events arrive, the sliding window function buffering and continuously maintaining events within the sliding window of events from the data stream;
in response to the parameter of the sliding window function being set to a first value, responding, by the sliding window function, to an information request by returning the sliding window of events stored in the event pipe;
emptying the event pipe whenever the sliding window of events stored in the pipeline has been utilized; and
in response to the parameter of the sliding window function being set to a second value, returning, by the sliding window function, a null value, while the sliding window function still buffers and continuously maintains events within the sliding window of events from the data stream, the null value being returned even though new events are being received from the data stream.

2. A method as in claim 1 wherein the data stream is received by a stream capture function that includes a parameter that identifies a source of the data stream.

3. A method as in claim 2 wherein the stream capture function returns a tuple that describes an event.

4. A method as in claim 1 wherein the data stream contains stock prices over time of a stock listed on a stock exchange.

5. The method of claim 1, further comprising:
setting the parameter of the sliding window function to the first value in response to receiving the information request from a client application; and
setting the parameter of the sliding window function to the sliding value in response to not receiving the information request from the client application.

6. A system comprising:
hardware, including a processor and memory;
a database stored on a storage device; and,
an interface for accessing the database and implemented at least by the hardware, the interface including:
a data access module, the data access module including an application program interface that:
receives a data stream of continuous data;
sets up an event pipe in which is stored a sliding window of events from the data stream using a sliding window function having a parameter, the sliding window function buffering and continuously maintaining events within the sliding window of events from the data stream;
in response to the parameter of the sliding window function being set to a first value, responds to an information request by the sliding window function returning the sliding window of events stored in the event pipe, wherein each event of the sliding window of events is stored within the event pipe as a tuple that maps attributes to values, and wherein old events within the event pipe are moved out of the event pipe as new events arrive, and wherein the event pipe is emptied whenever the sliding window of events stored in the pipeline have been utilized; and
in response to the parameter of the sliding window function being set to a second value, returning by the sliding window function returning a null value, while the sliding window function still buffers and continuously maintains events within the sliding window of events from the data stream, the null value being returned even though new events are being received from the data stream.

7. A system as in claim 6 wherein the application program interface includes a stream capture function that receives the data stream, the stream capture function including a parameter that identifies a source for the data stream.

8. A system as in claim 7 wherein the stream capture function returns a tuple that describes an event.

9. A system as in claim 6 wherein the data stream contains stock prices over time of a stock listed on a stock exchange.

10. A method comprising:

storing a data stream in a database;

storing in an event pipe a sliding window of events from the data stream using a sliding window function having a parameter, wherein each event of the sliding window of events is stored within the event pipe as a tuple that maps attributes to values, and wherein old events within the event pipe are moved out of the event pipe as new events arrive, the sliding window function buffering and continuously maintaining events within the sliding window of events from the data stream;

in response to the parameter of the sliding window function being set to a first value, responding, by the sliding window function, to a query by returning the sliding window of events stored in the event pipe;

emptying the event pipe whenever the sliding window of events stored in the pipeline has been utilized; and in response to the parameter of the sliding window function being set to a second value, returning, by the sliding window function, a null value, while the sliding window function still buffers and continuously maintains events within the sliding window of events from the data stream, the null value being returned even though new events are being received from the data stream.

* * * * *